United States Patent

[11] 3,604,526

| [72] | Inventor | Marion E. Hutchison<br>Omaha, Nebr. |
|---|---|---|
| [21] | Appl. No. | 839,877 |
| [22] | Filed | July 8, 1969 |
| [45] | Patented | Sept. 14, 1971 |
| [73] | Assignee | Omsteel Industries, Inc. |

[54] ARTICULATED VEHICLE
4 Claims, 5 Drawing Figs.

[52] U.S. Cl. .................................................... 180/51,
280/109
[51] Int. Cl. ........................................... B60k 17/34,
B62d 53/02
[50] Field of Search ........................................... 180/50, 51,
52, 79.2 B, 14; 280/109

[56] References Cited
UNITED STATES PATENTS

| 1,066,072 | 7/1913 | Bouas | 180/50 |
| 2,598,863 | 6/1952 | Tucker | 180/50 |
| 2,835,397 | 5/1958 | Wagner | 180/51 UX |
| 3,189,117 | 6/1965 | Ammon | 180/51 |

FOREIGN PATENTS

| 488,662 | 12/1952 | Canada | 180/51 |
| 347,717 | 8/1960 | Switzerland | 180/51 |

*Primary Examiner*—A. Harry Levy
*Attorney*—Hofgren, Wegner, Allen, Stellman & McCord ABSTRACT: A connecting means for interconnecting independent, wheeled frames of an articulated vehicle. Connecting means include a casting having a pair of vertically projecting stub shafts which are pivotally secured to one of the frames and a horizontally projecting stub shaft which is pivotally retained in the other of the frames so that a vertically projecting stub shaft provides for movement of one frame relative to the other about a vertical axis while the horizontally arranged stub shaft provides for relative movement about a horizontal axis. Further, in one embodiment, the casting is provided with a hollow center so that drive means for, for example, a four-wheel drive vehicle may extend through the joint between frames.

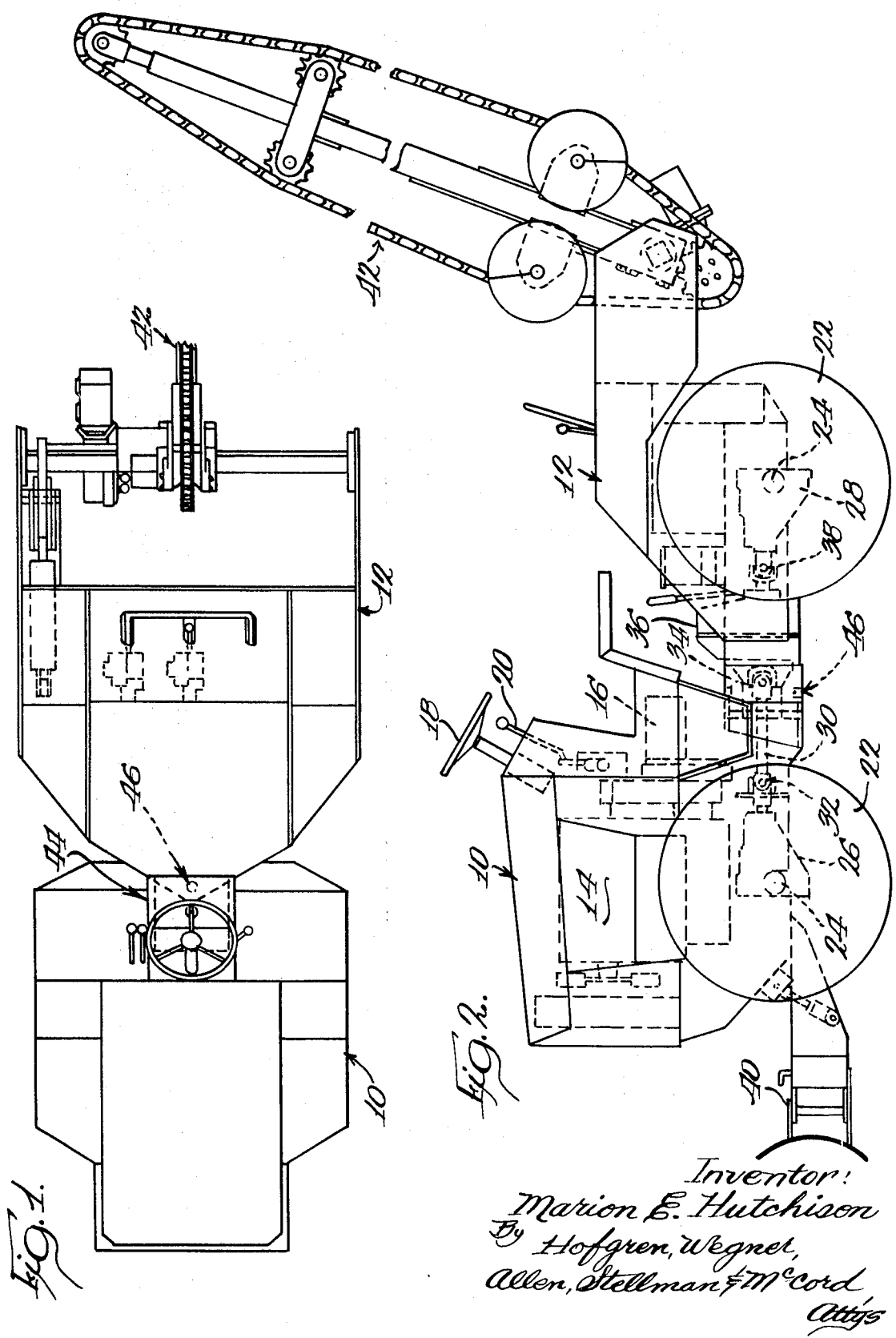

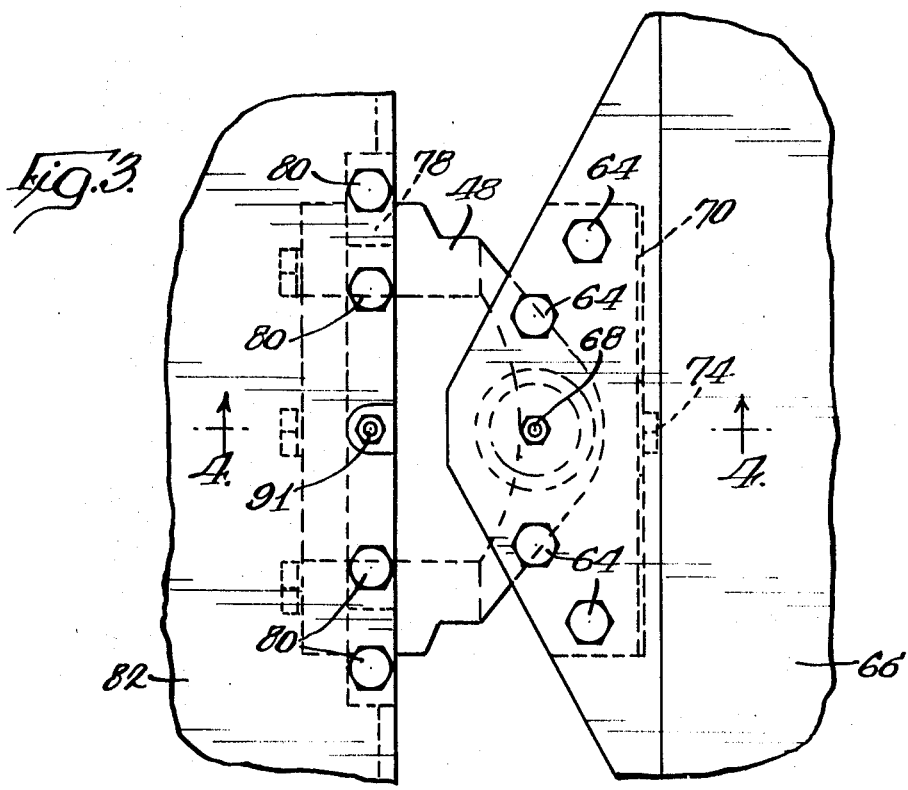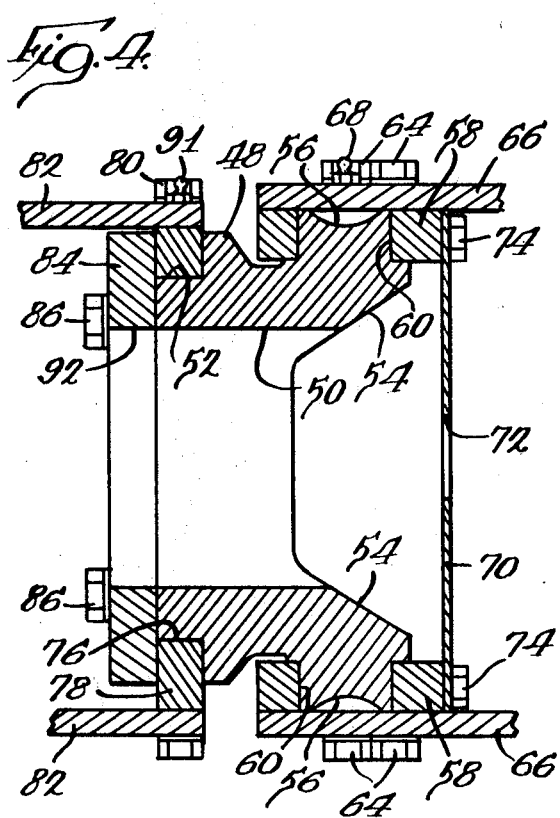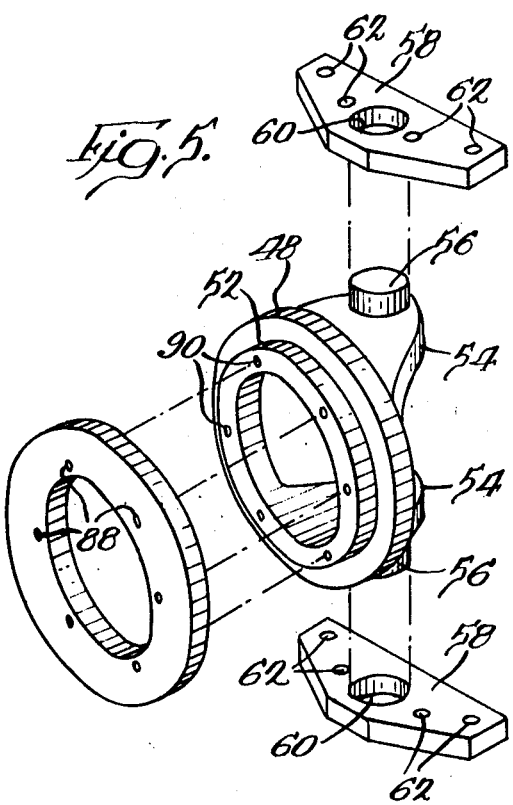

ARTICULATED VEHICLE

BACKGROUND OF THE INVENTION

In recent years, the popularity of articulated vehicles has increased due to their obvious advantages with respect to operation on rough terrain. Of course, in order to insure that such advantages are not offset due to increased maintenance problems, it is necessary that the heart of the vehicle, the connecting means between the two vehicle frames, be extremely rugged.

Heretofore, the connecting means have often been formed of a plurality of movable members which are pivotally connected to both frames of the vehicle. Such connecting means have typically required at least four pivotal connections and because a plurality of connecting members are used, the various forces applied to the connecting means as the vehicle traverses rough terrain may be applied unequally to the connecting members resulting in the possibility that one member may be subjected to overload while the remaining member may be subjected to very little load whatsoever. Thus, such connecting means are often prone to failure of one member which results in failure of the entire connecting means.

SUMMARY OF THE INVENTION

It is the principal object of the invention to provide a new and improved connecting means for articulated vehicles. In one embodiment of the invention, the connecting means comprises a generally horizontally arranged, cylindrically shaped, hollow casting having at one end, a reduced diameter portion. The reduced diameter portion is journalingly received in a plate having a circular opening and which is secured to one frame of the articulated vehicle. A retaining plate having a diameter greater than the opening in the plate is secured to the end of the casting so as to retain the same in the opening. The other end of the casting terminates in a pair of ears each having oppositely extending, generally vertical stub shafts which are received in horizontally spaced apertured brackets secured to the second frame of the vehicle. The stub shafts are thus pivotally received and retained for rotation about a vertical axis while the reduced diameter portion is received for rotation about a horizontal axis thereby providing generally universal movement between the two frames. The hollow center is provided so that, where a four-wheel drive is utilized with the articulated vehicle, drive means interconnecting the wheels of each frame may extend through the hollow center of the connecting means.

DESCRIPTION OF THE DRAWINGS

FIG. 1 is a plan view of an articulated vehicle utilizing a connecting means made according to the invention;

FIG. 2 is a side elevation of the vehicle;

FIG. 3 is an enlarged, fragmentary plan view of the connecting means;

FIG. 4 is a vertical section taken approximately along the line 4—4 of FIG. 3; and FIG. 5 is an exploded view of the connecting means apart from the articulated vehicle.

DESCRIPTION OF THE PREFERRED EMBODIMENT

An articulated vehicle includes a first frame, generally designated 10 and a second frame, generally designated 12, as sin in FIGS. 1 and seen Included in the first frame 10 is a power plant 14 which drives a plurality of hydraulic pumps including a pump 16. Additionally associated with the first frame 10 is a steering means 18 and speed control means 20.

Both of the frames 10 and 12 mount wheels 22 on axles 24 associated with respective differentials 26 and 28.

The differential 26 receives rotary power via a drive shaft 30 which is coupled by a universal joint 32 to the differential 26 and a universal joint 34 to a hydraulic motor and transmission 36. The hydraulic motor and transmission 36 is connected by means of a universal joint 38 to provide rotary power to the differential 28.

As illustrated in FIG. 1, the forward end of the first frame 10 mounts plow means 40 which form no part of the present invention while the second frame 12 mounts a trenching apparatus, generally designated 42.

As best seen in FIG. 1, the frames 10 and 12 are interconnected for relative motion by a connecting means generally designated 44. As will be seen, the connecting means 44 provides for generally universal movement of one frame with respect to the other and to provide for pivoting about a vertical axis, vertical pivot means, generally designated 46 are provided. As seen in FIG. 2, the vertical axis of the pivot means 46 generally coincides with the axes of movement provided by the universal joint 34.

Turning now to FIGS. 3–5 inclusive, the connecting means 44 will be described in detail. The principal element of the connecting means 44 is a horizontally arranged, generally cylindrical casting 48 having a hollow center 50. Adjacent one end of the cylindrical casting 48 is a reduced diameter portion 52 while the other end of the casting 48 terminates in a pair of ears 54 having outwardly extending, vertically disposed stub shafts 56 projecting therefrom. The stub shafts 56 form the vertical pivot means 46 illustrated in FIG. 1.

In the exemplary embodiment of the invention, the stub shafts 56 are received in horizontally spaced brackets 58, each of which has an aperture or a bore 60 therein. The bore 60 journals the stub shafts 56 for rotation about a vertical axis. Each of the brackets 58 further includes threaded bores 62 which may receive bolts 64 for securing the respective bracket to spaced frame elements 66 of the second vehicle frame 12.

The frame element 66 may also include a grease fitting 68 for lubricating the just-described connection.

The brackets 58 may also serve as mounting means for a cover plate 70 having a central aperture 72 therein. Bolts 74 received in threaded bores (not shown) in the brackets 58 hold the plate 70 in the position illustrated in FIG. 4. The aperture 72 is generally aligned with the hollow center 50 of the casting 48 and in the exemplary embodiment, the arrangement is such that an output shaft from the transmission and hydraulic motor 36 (FIG. 2) may pass through the aperture 72 so that the universal joint 34 will be within the hollow center 50 of the casting 48.

Returning now to the reduced diameter portion 52 of the casting 48, it will be seen that the same is received within a bore or aperture 76 in a generally vertically arranged plate 78 and the length of the reduced diameter portion is about equal to the thickness of the plate. The arrangement is such that the bore 76 journals the reduced diameter portion 52 for rotation about a generally horizontal axis.

Bolts 80 secure the upper and lower extremities of the plate 78 to spaced frame elements 82 of the first vehicle frame 10 and a retaining ring 84 having a diameter larger than the diameter of the reduced diameter portion 52 is secured to the end of the casting 48 by means of bolts 86 which extend through bores 88 in the retaining element 84 to be received in threaded bores 90 within the end of the casting 46. A grease fitting 91 provides for lubrication of the joint thus formed.

The retaining element 84 also includes a hollow center 92 of approximately the same diameter as the hollow center 50 of the cylindrical casting 48. As a result, and as seen in FIG. 2, the drive shaft 30 may extend through the center of the connecting means 44.

The just-described construction provides a number of advantages over connecting joints heretofore used in articulated vehicles. For example, it provides for a significantly more compact joint construction with fewer parts. Furthermore, there is but a single casting utilized which is subjected to all the forces involved. Thus, unequal subjection to forces as is present in many prior art constructions is avoided. Finally, the same is ideally suited for those articulated vehicles having driven wheels associated with both frames in that the drive means can readily pass through the connecting means itself.

I claim:

1. In an articulated vehicle including two separate, wheeled frames and means joining said frames and permitting relative movement between said frames, the improvement in said joining means comprising: a casting having a pair of vertically projecting stub shafts, means pivotally securing said stub shaft to one of said frames; said casting including a horizontally projecting stub shaft; means journaling said horizontally projecting stub shaft in the other of said frames; and means for retaining said horizontally projecting stub shaft in said journaling means, said journaling means comprising a generally vertically arranged plate having an opening therein and secured to an end of one of said frames, said horizontally projecting stub shaft having a length about equal to the thickness of said plate and being received within said opening; said retaining means comprising a member secured to the end of said horizontally projecting stub shaft and having a greater radial extent than the opening in said plate.

2. In an articulated vehicle including two separate, wheeled frames and means joining said frames and permitting relative movement between said frames, the improvement in said joining means comprising: a casting having a pair of vertically projecting stub shafts, means pivotally securing said stub shaft to one of said frames; said casting including a horizontally projecting stub shaft; means journaling said horizontally projecting stub shaft in the other of said frames; and means for retaining said horizontally projecting stub shaft in said journaling means, said casting comprising a cylindrically shaped member and said horizontally projecting stub shaft comprising a reduced diameter portion on one end of said member defining a single bearing surface; the other end of said member terminating in opposed ears with said vertically projecting stub shafts extending outwardly from said ears.

3. The invention of claim 2 wherein said means pivotally securing said vertically projecting stub shafts to one of said frames comprises a pair of apertured brackets, means removably securing said brackets to said one frame in horizontally spaced relation; said vertically projecting stub shafts being received in the apertures of respective ones of said brackets.

4. An articulated vehicle comprising a first frame having a pair of wheels to be driven; a second frame having a pair of wheels to be driven; motor means on one of said frames; and means articulately interconnecting said frames and comprising a generally horizontal, cylindrically shaped, hollow casting having, at one end, a reduced diameter portion, a generally vertically arranged plate having a circular opening therein secured to one of said frames and receiving said reduced diameter portion, means secured to said one end and having a radial extent greater than said opening in said plate for pivotally retaining said cylindrical member secured to said one frame, a pair of oppositely extending, generally vertical stub shafts on said cylindrical member, and a pair of horizontally spaced, apertured brackets removably secured to said second frame, said stub shafts being pivotally received and retained in said apertures so that said reduced diameter portion permits relative movement between said two frames about a horizontal axis while said stub shafts permit relative movement between said two frames about a vertical axis; and drive means associated with said motor means and extending through the hollow center of said cylindrical member for driving both said pairs of wheels.